(12) United States Patent
Wedel et al.

(10) Patent No.: US 9,720,272 B2
(45) Date of Patent: Aug. 1, 2017

(54) METHOD FOR PRODUCING A DISPLAY UNIT, AND DISPLAY UNIT

(71) Applicant: Continental Automotive GmbH, Hannover (DE)

(72) Inventors: Hans Wedel, Muehltal (DE); Edwin Esser, Dietzenbach (DE); Ulrich Georg Hermann, Babenhausen (DE); Günter Urlaub, Schaafheim (DE); Ralf Leupert, Hofheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/106,087

(22) PCT Filed: Dec. 12, 2014

(86) PCT No.: PCT/EP2014/077655
§ 371 (c)(1),
(2) Date: Jun. 17, 2016

(87) PCT Pub. No.: WO2015/091296
PCT Pub. Date: Jun. 25, 2015

(65) Prior Publication Data
US 2016/0313597 A1 Oct. 27, 2016

(30) Foreign Application Priority Data
Dec. 18, 2013 (DE) .......................... 10 2013 226 547

(51) Int. Cl.
*G02F 1/1333* (2006.01)
(52) U.S. Cl.
CPC ...... *G02F 1/133308* (2013.01); *G02F 1/1333* (2013.01); *G02F 2001/13332* (2013.01);
(Continued)

(58) Field of Classification Search
CPC ............. G02F 1/133308; G02F 1/1333; G02F 2001/133325; G02F 2001/133331; G02F 2202/28; G02F 2001/13332
See application file for complete search history.

(56) References Cited

U.S. PATENT DOCUMENTS

2008/0230177 A1* 9/2008 Crouser ............ G02F 1/133502
156/275.5
2009/0288756 A1 11/2009 Dunn et al.
(Continued)

FOREIGN PATENT DOCUMENTS

CN 101785041 7/2010
EP 2144218 1/2010

*Primary Examiner* — Donald Raleigh
(74) *Attorney, Agent, or Firm* — Cozen O'Connor

(57) ABSTRACT

A method for producing a display unit includes: inserting a covering glass into a first holder of a positioning device until the covering glass lies on a first contact surface parallel to the covering glass; thereafter inserting a bonding frame into a second holder of the positioning device until the bonding frame lies on a second contact surface parallel to the first contact surface. The bonding frame has a leg parallel to the covering glass, the peripheral edge of which leg directed toward the covering glass surrounds the peripheral edge of the covering glass at a distance forming a groove. Thereafter the groove between the covering glass and the leg of the bonding frame is filled with a first adhesive that connects these two parts to each other, and thereafter the surface of the covering glass facing away from an observer is covered with the layer of transparent bonding mass.

11 Claims, 2 Drawing Sheets

(52) U.S. Cl.
CPC ............ *G02F 2001/133325* (2013.01); *G02F 2001/133331* (2013.01); *G02F 2202/28* (2013.01)

(56) References Cited

U.S. PATENT DOCUMENTS

2010/0073595 A1     3/2010  Zhang et al.
2014/0327855 A1*   11/2014  Tang ................ G02F 1/133308
                                                                 349/58

* cited by examiner

METHOD FOR PRODUCING A DISPLAY UNIT, AND DISPLAY UNIT

CROSS-REFERENCE TO RELATED APPLICATIONS

This is a U.S. national stage of application No. PCT/EP2014/077655, filed on 12 Dec. 2014, which claims priority to the German Application No. 10 2013 226 547.6 filed 18 Dec. 2013, the content of both incorporated herein by reference.

BACKGROUND OF THE INVENTION

1. Field of the Invention

The invention relates to a method for producing a display unit and to a display unit that comprises an electro-optical display having a sheet-like actively controllable region and a covering glass arranged in front on the observer side, a layer of transparent bonding mass being arranged between the electro-optical display and the covering glass and the covering glass being connected to the electro-optical display by adhesive connections by a bonding frame to form a structural unit, which can be inserted into a recess of a display panel in such a way that the surfaces on the observer side of the covering glass and the display panel lie in one plane.

2. Related Art

In the case of such display units, to avoid optical impairments of the displays of the display unit it is necessary that the sheet-like actively controllable region and the covering glass are arranged at a defined distance from one another. Furthermore, the gap formed between the electro-optical display and the covering glass, and filled with the bonding mass, must be maintained exactly at a specific dimension in order to be able to set the volume of the bonding mass in a defined manner.

For this purpose, it is known to determine this gap by spacers between the covering glass and the display glass on the front side of the electro-optical display. This, however, leads to a complicated structure and is distracting in the area that can be seen by an observer.

SUMMARY OF THE INVENTION

An object of the invention is therefore to provide a method for producing a display unit and a display unit that is simply constructed, so as to avoid optical impairments, and can be easily produced and can be easily mounted on the display panel.

This object is achieved according to one aspect of the invention by a method for producing a display unit by providing that the covering glass is placed into a first receptacle of a positioning device until it lies on a first contact surface parallel to the plane of the covering glass, that thereafter the bonding frame is placed into a second receptacle of the positioning device until it lies on a second contact surface parallel to the plane of the first contact surface, the distance of the planes of the first and second contact surfaces from one another corresponding to the thickness of the display panel in its region enclosing the recess, that the bonding frame has a leg parallel to the covering glass and the peripheral edge of which, directed toward the covering glass, encloses the peripheral edge of the covering glass at a distance forming a groove, the leg having on its side facing away from the observer side a third contact surface, which is parallel to the plane of the covering glass and the plane of which extends parallel to and at a certain distance from the surface of the covering glass that is facing away from an observer, that thereafter the groove between the covering glass and the leg of the bonding frame is filled with a first adhesive, connecting these two parts to one another, that thereafter the surface of the covering glass that is facing away from an observer is covered with the layer of transparent bonding mass, which extends up to the end face of the leg that is facing the covering glass and the side of which that is facing away from an observer forms a plane with the third contact surface of the leg, that thereafter the electro-optical display is placed with its observer side onto the bonding mass, so that, with its radially peripheral edge region that extends beyond the covering glass, the electro-optical display is lying on the third contact surface of the leg, that thereafter a second adhesive is introduced between the peripheral edge region of the electro-optical display and the bonding frame, connecting the electro-optical display directly or indirectly to the bonding frame, and that thereafter the structural unit consisting of the covering glass, the electro-optical display and the bonding frame is brought up to the display panel from the side that is facing away from an observer until the bonding frame comes to lie against the display panel and is connected to the latter, the covering glass entering the recess of the display panel.

The electro-optical display is preferably a liquid crystal display or an OLED display.

The electro-optical display may not only have a planar form but also a domed or convex form, the contact surfaces of the positioning device being formed in a correspondingly domed or convex manner.

In preparation for introducing the bonding mass between the bonding frame and the covering glass by exact positioning in relation to one another in the positioning device and subsequent adhesive bonding, this production method creates a parallel receiving gap of a defined volume, into which the correspondingly defined volume of bonding mass can then be introduced. Distracting spacers are no longer required.

The groove between the covering glass and the bonding frame is closed in a liquid-impermeable manner by the first adhesive.

Preferably, the positioning device has a nonstick coating, at least on its surfaces that are acted upon by the components of the display unit, so that there is also no adhesion between the adhesive and the positioning device.

On the side of the electro-optical display that is facing away from an observer, a unit comprising control electronics and/or a lighting unit may be arranged, it being possible for the second adhesive to be introduced between the peripheral edge region of the unit that connects the unit securely connected to the electro-optical display to the bonding frame and the bonding frame.

The object is achieved according to another aspect of the invention in respect of a display unit by providing that between the side of the covering glass that is facing away from an observer and a front side of the electro-optical display there is a gap filled by the transparent bonding mass, a region of the electro-optical display that extends beyond the plane of the covering glass lying with its front side on a third contact surface of a leg of a bonding frame that is parallel to the covering glass, the third contact surface being the side of the leg that is remote from an observer and the side of the leg that is toward an observer extending parallel to the front side of the covering glass and at a distance from it that corresponds to the thickness of the display panel in its region surrounding the recess, with a distance between the mutually opposing radially peripheral sides of the leg and the covering glass, forming a groove, into which there has been introduced a first adhesive, connecting the covering glass and the bonding frame, with a second adhesive, which has been introduced between the radially peripheral edge of the electro-optical display, or the radially peripheral edge of a unit securely connected to the electro-optical display, and a region of the bonding frame that encloses the electro-optical display or the unit securely connected to it.

The same advantages and properties as in respect of a display unit produced by the method described above are achieved by this form.

An easily mountable, compact display device of low weight results if the bonding frame has an L-shaped cross section, the first portion of which, directed parallel to the covering glass, forms the leg of the bonding frame and the second portion of which is directed away from the display panel, the second adhesive having been introduced between the radially peripheral edge of the electro-optical display or the radially peripheral edge of a unit securely connected to the electro-optical display and the second portion of the L-shaped bonding frame.

The bonding frame may also have any other suitable cross-section.

If the bonding mass has a refractive index that corresponds at least approximately to the refractive indices of the covering glass and the substrate on the front side of the electro-optical display, the light passing through the covering glass, the bonding mass and the front glass of the electro-optical display is not refracted and not reflected at the boundary surfaces of these parts.

A light reflection of the light impinging on the covering glass is avoided if the covering glass consists of a material of low reflection and has an antiglare-antireflective coating on the front side.

For controlling the actively controllable region and for lighting the electro-optical display, the unit may comprise control electronics and/or a lighting unit, which is arranged on the side of the electro-optical display that is facing away from an observer, it being possible for the unit to have a housing to protect the control electronics and the lighting unit and also to form a light box.

If the actively controllable region of the electro-optical display extends over an area region that is the areal extent of the covering glass, a large area of the controllable region, and consequently a large area for displaying information, is made possible in relation to the front area of the display unit.

BRIEF DESCRIPTION OF THE DRAWINGS

An exemplary embodiment of the invention is described in more detail below and is represented in the drawings, in which.

DETAILED DESCRIPTION OF THE PRESENTLY PREFERRED EMBODIMENTS

Figure 1:
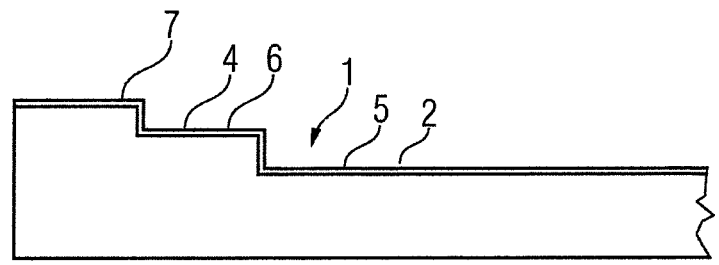
FIG. 1 shows a detail of a positioning device in cross section.

The positioning device 1 represented in FIG. 1 has a lower-lying first stepped recess 2, which corresponds in its peripheral contour to a covering glass 3 to be placed in and is open to one side. On the opening side of the first stepped recess 2, in the positioning device 1 there is formed a second stepped recess 4, the areal extent of which is greater than that of the first stepped recess 2, so that an offset in relation to the first stepped recess 2 is formed peripherally by the second stepped recess 4.

The bottom of the first stepped recess 2 forms a first contact surface 5 and the bottom of the second stepped recess 4 forms a second contact surface 6, parallel to the first contact surface 5.

The walls of the first and second stepped recesses 2 and 4 are provided with a nonstick coating 7.

Figure 2:
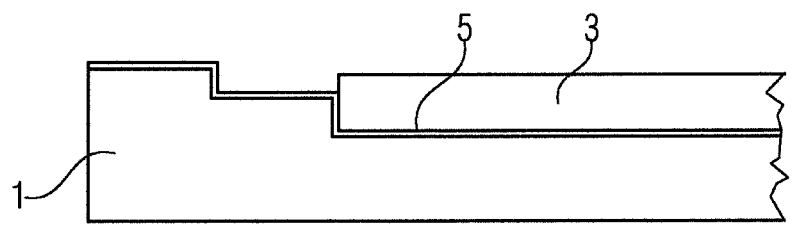
FIG. 2 shows a detail of the positioning device as shown in FIG. 1 with a placed-in covering glass in cross section.

In FIG. 2, the covering glass 3, which consists of a glass of low reflection and has an antiglare-antireflective coating on the front side, has been placed in.

Figure 3:
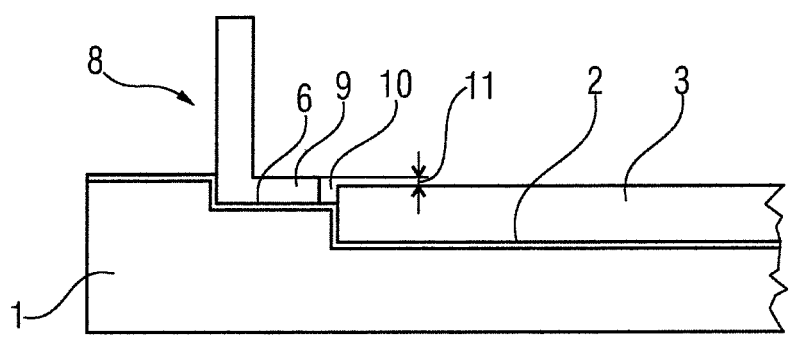
FIG. 3 shows a detail of the positioning device as shown in FIG. 1 with a placed-in covering glass and a bonding frame in cross section.

As FIG. 3 shows, in the second stepped recess 4 there has subsequently been placed an L-shaped bonding frame 8, which lies with the outer side 15 of its first portion, extending parallel to the plane of the covering glass 3 and forming a leg 9, on the first contact surface 5 and is directed with its free end toward the covering glass. In this case, a distance that forms a groove 10 remains between the end face at the free end of the leg 9 and the radially peripheral end face of the covering glass 3.

The inner side 16 of the leg 9, parallel to the outer side 15 of the leg 9, extends in a plane that extends parallel to and at a certain distance 11 from the plane of the side of the covering glass 3 that is facing away from an observer.

Figure 4:
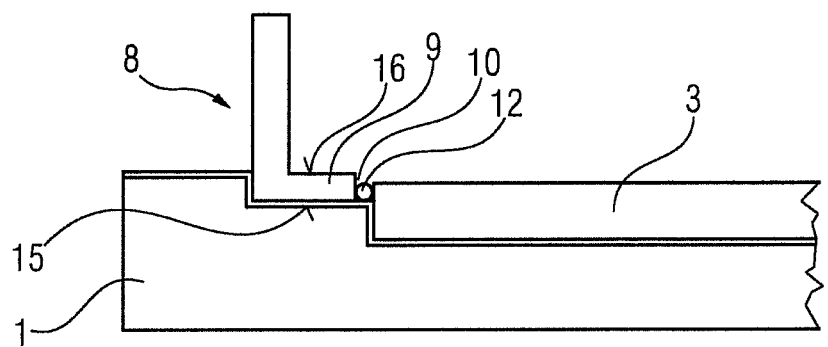
FIG. 4 shows a detail of the positioning device as shown in FIG. 1 with a placed-in covering glass and a bonding frame and also a first adhesive in cross section.

In FIG. 4, the groove 10 has been filled with a first adhesive 12, and thus has connected the covering glass 3 to the bonding frame 8.

Figure 5:
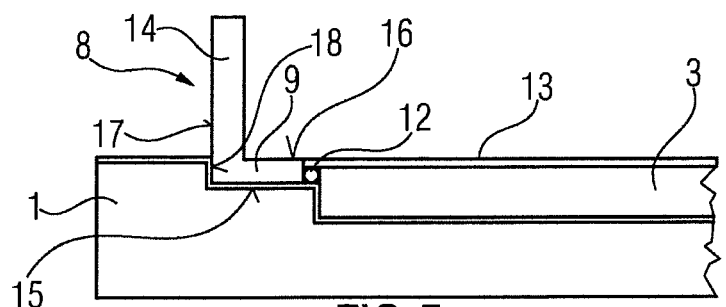
FIG. 5 shows a detail of the positioning device as shown in FIG. 1 with a placed-in covering glass and a bonding frame and also a first adhesive and an introduced bonding mass in cross section.
Figure 6:
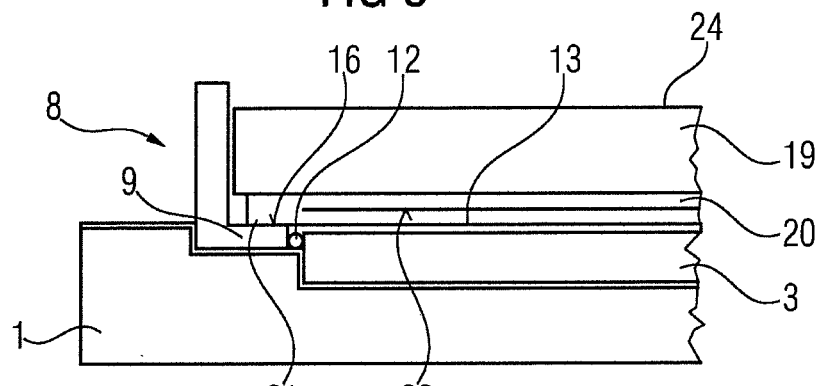
FIG. 6 shows a detail of the positioning device as shown in FIG. 1 with a placed-in covering glass, a bonding frame, a liquid crystal display and a display module and also a first adhesive and an introduced bonding mass in cross section.

As FIG. 5 shows, the side of the covering glass 3 that is facing away from an observer has been covered with a layer of a defined volume of a transparent bonding mass 13 in such a way that its plane facing away from an observer extends in the same plane as the inner side 16 of the leg 9. The layer of the bonding mass 13 reaches beyond the first adhesive 12 up to the free end face of the leg 9.

The second portion 14 of the L-shaped bonding frame 8 extends away from the second contact surface 6 and is lying with its outer side 17 against the side wall 18 of the second stepped recess 4.

In the receptacle formed by the bonding frame 8 there has subsequently been inserted a structural unit comprising a liquid crystal display 20 and a display module 19. As FIG.

7 shows, the liquid crystal display 20 has a greater extent than the covering glass 3 and lies with its region 21 of its front side 22 that extends beyond the covering glass 3 on the inner side 16 of the leg 9. Otherwise, the liquid crystal display is lying with its front side, formed by a display glass, on the bonding mass 13.

The covering glass, the bonding mass 13 and the display glass of the liquid crystal display 20 have largely corresponding refractive indices.

The extent of the area region of the actively controllable region 23 of the liquid crystal display 20 corresponds to the area of the covering glass 3 and is in parallel congruence with the latter.

Figure 7:
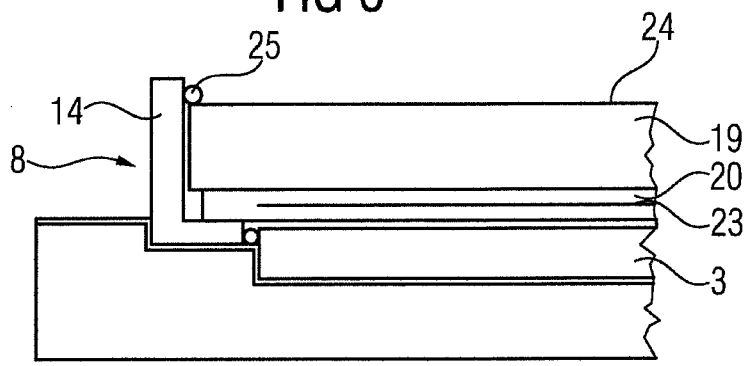
FIG. 7 shows a detail of the positioning device as shown in FIG. 1 with a placed-in covering glass, a bonding frame, a liquid crystal display and a display module and also a first and a second adhesive and an introduced bonding mass in cross section.
Figure 8:
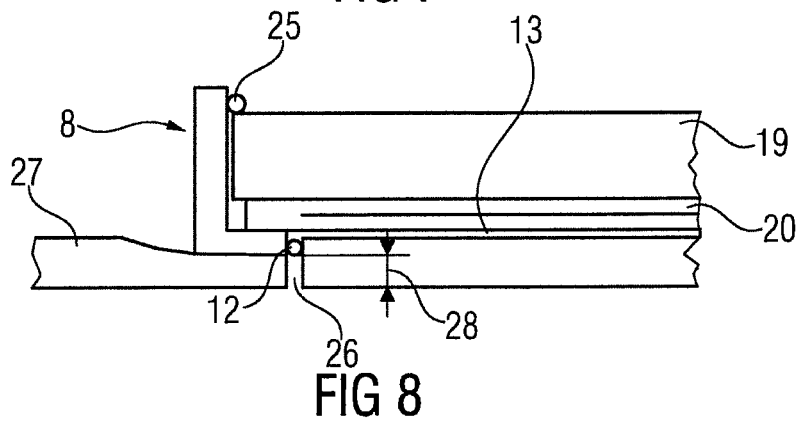
FIG. 8 shows a detail of a display unit inserted into a recess of a display panel in cross section.

The display module 19 has a housing 24 and has been connected by a second adhesive 25 to the second portion 14 of the bonding frame 8 (FIG. 7), so that the display unit is then ready for fitting into a recess 26 of a display panel 27.

In the housing 24 of the display module 19 there are control electronics for controlling the actively controllable region 23 of the liquid crystal display 20 and a lighting unit for transilluminating the liquid crystal display 20.

The depth of the first stepped recess 4 corresponds to the thickness of the display panel 27 in its region enclosing the recess 26. As a result, the distance 28 between the plane of the outer side 15 of the leg 9 and the area of the covering glass 3 on the observer side also corresponds to the thickness of the display panel 27 in its region enclosing the recess 26, so that the plane of the area of the covering glass 3 on the observer side extends in the same plane as the area of the display panel 27 on the observer side.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a display unit that includes an electro-optical display having a sheet-like actively controllable region (23) and a covering glass (3) arranged on an observer side, a layer of transparent bonding mass (13) being arranged between the electro-optical display and the covering glass (3) and the covering glass (3) being connected to the electro-optical display by adhesive connections by a bonding frame (8) to form a structural unit, inserted in a recess (26) of a display panel (27), such that surfaces on the observer side of the covering glass (3) and the display panel (27) lie in one plane, the method comprising:
    placing the covering glass (3) into a first receptacle of a positioning device (1) so that the covering glass (3) lies on a first contact surface (5) parallel to the plane of the covering glass (3);
    placing the bonding frame (8) into a second receptacle of the positioning device (1) so that the bonding frame (8) lies on a second contact surface (6) parallel to the plane of the first contact surface (5), the distance (28) between the planes of the first and second contact surfaces (5, 6) corresponding to a thickness of the display panel (27) in a region enclosing the recess (26), the bonding frame (8) having a leg (9) parallel to the covering glass (3), the peripheral edge of which, directed toward the covering glass (3), encloses the peripheral edge of the covering glass (3) at a distance (11) forming a groove (10), the leg (9) having on its side facing away from the observer side a third contact surface (16), parallel to the plane of the covering glass (3) and the plane of which extends parallel to and at a distance from the surface of the covering glass (3) that is facing away from the observer side;
    filling, with a first adhesive (12), the groove (10) between the covering glass (3) and the leg (9) of the bonding frame (8) so as to connect the covering glass (3) and the leg (9) to one another;
    covering, with the layer of transparent bonding mass (13), the surface of the covering glass (3) that is facing away from the observer side such that the layer of transparent bonding mass (13) extends up to an end face of the leg (9) that is facing the covering glass (3) and a side of the layer of transparent bonding mass (13) facing away from the observer side forms a plane with the third contact surface (16) of the leg (9);
    placing the electro-optical display with its observer side onto the bonding mass (13), so that, with its peripheral edge region that extends beyond the covering glass (3), the electro-optical display is lying on the third contact surface (16) of the leg (9);
    introducing a second adhesive (25) between the peripheral edge region of the electro-optical display and the bonding frame (8), so as to connect the electro-optical display directly or indirectly to the bonding frame (8); and
    bringing up the structural unit consisting of the covering glass (3), the electro-optical display and the bonding frame (8) to the display panel (27) from a side facing away from the observer side until the bonding frame (8) is lying against the display panel (27) and is connected to the display panel (27), the covering glass (3) entering the recess (26) of the display panel (27).

2. The method as claimed in claim 1, further comprising arranging, on the side of the electro-optical display facing away from the observer side, a unit (19) comprising control electronics and/or a lighting unit.

3. The method as claimed in claim 2, wherein the second adhesive (25) is introduced between the peripheral edge region of the unit (19) that connects the unit (19) to the bonding frame (8).

4. A display unit, comprising:
    an electro-optical display having a sheet-like actively controllable region (23);
    a covering glass (3) arranged on an observer side so as to form a gap between the covering glass (3) and the electro-optical display;
    a layer of transparent bonding mass (13) arranged in the gap between the electro-optical display and the covering glass (3);
    a bonding frame (8) connecting the covering glass (3) to the electro-optical display by adhesive connections to form a structural unit, which structural unit is arranged in a recess (26) of a display panel (27) such that the surfaces on the observer side of the covering glass (3) and the display panel (27) lie in one plane, the bonding frame (8) having a leg (9), the leg (9) having on its side facing away from the observer side a third contact surface (16), wherein the electro-optical display has a region (21) arranged so as to extend radially beyond the plane of the covering glass (3) lying with its front side on the third contact surface (16) of the leg (9) of the bonding frame (8) that is parallel to the covering glass (3), and a side of the leg (9) that is toward the observer side extending parallel to the front side of the covering glass (3) and at a distance from the covering glass (3) that corresponds to a thickness of the display panel (27) in a region surrounding the recess (26), with a distance between mutually opposing radially peripheral sides of the leg (9) and the covering glass (3) forming a groove (10), into which is arranged a first adhesive (12), connecting the covering glass (3) and the bonding frame (8), a second adhesive (25), arranged between the radially peripheral edge of the electro-optical display, or the radially peripheral edge of a unit (19) securely connected to the electro-optical display, and a region of the bonding frame (8) that encloses the electro-optical display or the unit (19) securely to it.

5. The display unit as claimed in claim 4, wherein the bonding frame (8) has an L-shaped cross section, a first portion of which, directed parallel to the covering glass (3), forms the leg (9) of the bonding frame (8), and a second portion (14) of which is directed away from the display panel (27), the second adhesive (25) being arranged between the radially peripheral edge of the electro-optical display or the radially peripheral edge of a unit (19) securely connected to the electro-optical display and the second portion (14) of the bonding frame (8).

6. The display unit as claimed in claim 5, wherein the bonding mass (13) has a refractive index that corresponds at least approximately to refractive indices of the covering glass (3) and a substrate on a front side of the electro-optical display.

7. The display unit as claimed in claim 6, wherein the covering glass (3) consists of a material of low reflectivity.

8. The display unit as claimed in claim 7, wherein the covering glass (3) has an antiglare-antireflective coating.

9. The display unit as claimed in claim 8, wherein the unit (19) has control electronics and/or a lighting unit.

10. The display unit as claimed in claim 9, wherein the unit (19) has a housing (24).

11. The display unit as claimed in claim 9, wherein the actively controllable region (23) of the electro-optical display extends over an area region that is less than or equal to the areal extent of the covering glass (3).

* * * * *